US008602495B2

(12) United States Patent
Jeong et al.

(10) Patent No.: US 8,602,495 B2
(45) Date of Patent: Dec. 10, 2013

(54) FOLD-AND DIVE STRUCTURE FOR VEHICLE SEAT

(75) Inventors: Chan Ho Jeong, Seoul (KR); Sang Do Park, Ansan-si (KR); Tae Hoon Lee, Hwaseong-si (KR); Jong Kweon Pyun, Suwon-si (KR); Seon Chae Na, Yongin-si (KR); Kwang Bin Im, Anyang-si (KR); Do Kyun Kim, Seoul (KR); Jae Myung Hur, Seoul (KR)

(73) Assignees: Hyundai Motor Company, Seoul (KR); Kia Motors Corporation, Seoul (KR); Daewon Sanup Co., Ltd., Ansan-Si (KR)

( * ) Notice: Subject to any disclaimer, the term of this patent is extended or adjusted under 35 U.S.C. 154(b) by 127 days.

(21) Appl. No.: 13/296,677

(22) Filed: Nov. 15, 2011

(65) Prior Publication Data
US 2012/0139311 A1 Jun. 7, 2012

(30) Foreign Application Priority Data

Dec. 3, 2010 (KR) .................. 10-2010-0123072

(51) Int. Cl.
*B60N 2/02* (2006.01)
(52) U.S. Cl.
USPC ................ 297/334; 297/378.12; 297/378.14; 297/344.11; 297/344.15
(58) Field of Classification Search
USPC .................... 297/313, 344.11, 324, 316, 317, 297/344.15, 378.1, 334, 378.12, 378.14
See application file for complete search history.

(56) References Cited

U.S. PATENT DOCUMENTS

| 4,304,384 | A | * | 12/1981 | Cremer et al. ............... 248/397 |
| 4,312,537 | A | * | 1/1982 | Lindenberg ................... 297/317 |
| 4,767,156 | A | * | 8/1988 | Yamada et al. ............... 297/313 |
| 5,597,206 | A | * | 1/1997 | Ainsworth et al. ...... 297/378.12 |
| 6,155,644 | A | * | 12/2000 | Rogala ....................... 297/367 R |
| 6,474,739 | B1 | * | 11/2002 | Lagerweij ..................... 297/341 |
| 6,817,646 | B2 | * | 11/2004 | Kikuchi et al. ............ 296/65.05 |
| 6,899,392 | B1 | * | 5/2005 | Saberan et al. ............... 297/334 |
| 7,066,539 | B2 | * | 6/2006 | Hatta et al. ............... 297/344.14 |
| 7,201,437 | B2 | * | 4/2007 | Freijy ............................. 297/61 |
| 7,270,371 | B2 | * | 9/2007 | Adragna et al. ................ 297/14 |
| 7,367,625 | B2 | * | 5/2008 | Mori et al. ............... 297/378.12 |
| 7,997,653 | B2 | * | 8/2011 | Szybisty et al. ............. 297/336 |
| 2004/0026978 | A1 | * | 2/2004 | Kim ......................... 297/378.12 |

(Continued)

FOREIGN PATENT DOCUMENTS

JP 2000-272396 A 10/2000
JP 2008-173278 A 7/2008

(Continued)

*Primary Examiner* — David Dunn
*Assistant Examiner* — Alexander Harrison
(74) *Attorney, Agent, or Firm* — Morgan, Lewis & Bockius LLP

(57) ABSTRACT

A fold-and-dive structure for a vehicle seat is provided, which includes a connection member connecting a cushion frame built in a seat cushion and a back frame built in a seat back to each other, a rotating link connecting a front end portion of the cushion frame and a support frame to each other, and a recliner provided on the support frame to which a lower end portion of the back frame is rotatably connected, wherein a guide frame is provided on a front side portion of the connection member, and the cushion frame is slidably coupled to the guide frame to make the seat cushion slide forward.

6 Claims, 12 Drawing Sheets

(56) References Cited

U.S. PATENT DOCUMENTS

| | | | |
|---|---|---|---|
| 2004/0056521 A1* | 3/2004 | Kayumi et al. | 297/334 |
| 2004/0108765 A1* | 6/2004 | Habedank | 297/378.12 |
| 2004/0140704 A1* | 7/2004 | Abdella et al. | 297/344.11 |
| 2005/0110324 A1* | 5/2005 | Mori et al. | 297/378.12 |
| 2006/0066144 A1* | 3/2006 | Tsujibayashi et al. | 297/378.14 |
| 2006/0214477 A1* | 9/2006 | Fukada et al. | 297/15 |
| 2007/0182231 A1* | 8/2007 | Lutzka et al. | 297/378.12 |
| 2007/0210635 A1* | 9/2007 | Wulf et al. | 297/316 |
| 2008/0143159 A1* | 6/2008 | Song | 297/317 |
| 2008/0211283 A1 | 9/2008 | Okano et al. | |
| 2008/0224519 A1* | 9/2008 | Ventura et al. | 297/313 |
| 2009/0302631 A1* | 12/2009 | Grudl et al. | 296/65.05 |
| 2009/0322134 A1* | 12/2009 | Yamada et al. | 297/324 |
| 2010/0052389 A1* | 3/2010 | Holdampf | 297/316 |
| 2011/0101751 A1* | 5/2011 | Meister et al. | 297/319 |
| 2012/0056459 A1* | 3/2012 | Harden | 297/316 |

FOREIGN PATENT DOCUMENTS

| | | |
|---|---|---|
| KR | 10-2004-0043827 A | 5/2004 |
| KR | 10-2005-0038093 A | 4/2005 |
| KR | 1020050038093 A | 4/2005 |
| KR | 10-2005-0041233 A | 5/2005 |
| KR | 1020090061795 A | 6/2009 |

* cited by examiner

FOLD-AND DIVE STRUCTURE FOR VEHICLE SEAT

CROSS-REFERENCE TO RELATED APPLICATION

This application is based on and claims priority from Korean Patent Application No. 10-2010-0123072 filed Dec. 3, 2010, the entire contents of which application is incorporated herein for all purposes by this reference.

BACKGROUND OF INVENTION

1. Field of Invention

The present invention relates to a fold-and-dive structure for a vehicle seat, which makes a seat cushion slide forward when not only a seat back is folded but also a passenger gets on a vehicle to stably support the femoral region of the passenger.

2. Description of Related Art

In a fold-and-dive structure for a vehicle seat in the related art, an upper end of a link is hinge-engaged with a frame that is provided on a bottom surface of a front end of a seat cushion, and a lower end of the link is hinge-engaged with a front end of a support frame that is fixed to a floor panel.

Also, a side surface (an inner frame) of the seat cushion and a side surface (inner frame) of a seat back are hinge-engaged with each other through a connection link just like a boomerang shape, and a recliner device is integrally provided on an upper surface of a rear end of the support frame. A side surface of the seat back is rotatably connected to the recliner device.

According to the fold-and-dive structure for a vehicle seat in the related art, in the case of loading long luggage or the like thereon, a fold operation for folding the seat back and a dive operation for moving the seat cushion downward are performed to extend a loading space provided in the rear of the seat back.

That is, a user performs a fold operation for folding the seat back forward about the recliner device while making the seat back become in close contact with an upper surface of the seat cushion 12, and a dive operation for hinge-rotating a link provided on a bottom surface of a front end of the seat cushion forward while lowering the seat cushion downward to make the seat cushion become in close contact with the floor panel, and thus a space capable of accommodating long luggage is provided.

On the other hand, with the recent trend of compact vehicles, the length of the seat cushion becomes shortened, and thus the seat cushion of the fold-and-dive structure for a vehicle seat in the related art may not support the femoral region of a passenger sufficiently.

Also, according to the fold-and-dive structure for a vehicle seat in the related art, a step height between the luggage trim and the seat back occurs greatly to cause a problem in loading the luggage.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, various aspects of the present invention have been made to solve the above-mentioned problems occurring in the related art while advantages achieved by the prior art are maintained intact.

Various aspects of the present invention provide for a fold-and-dive structure for a vehicle seat that is provided with a slidable seat cushion, and which can increase the support of the femoral region of a passenger to improve riding comfort and reduce a step height between a folded seat back and a luggage trim.

The fold-and-dive structure for a vehicle seat may include a connection member connecting a cushion frame built in a seat cushion and a back frame built in a seat back to each other, a rotating link connecting a front end portion of the cushion frame and a support frame to each other, and a recliner provided on the support frame to which a lower end portion of the back frame is rotatably connected, wherein a guide frame is provided on a front side portion of the connection member, and the cushion frame is slidably coupled to the guide frame to make the seat cushion slide forward.

The cushion frame may be locked in or unlocked from the guide frame by a locking device.

The locking device may include a locking portion locking the cushion frame in the guide frame, and a lever releasing locking of the locking portion.

The locking portion may include a fixing piece fixed to a side portion of the cushion frame, a locking ring rotatably hinge-fixed to the fixing piece and inserted into a side portion of the guide frame to make the cushion frame lock in the guide frame, and a spring providing an elastic force to the locking ring, wherein the locking ring releases the locking of the cushion frame as the locking ring is rotated about the fixing piece when a lever is operated.

A plurality of locking holes may be formed on the side portion of the guide frame in a length direction, and the locking ring may be inserted into the locking holes to lock the cushion frame.

The lever may be mounted in front of the cushion frame, and may be connected to a locking ring through a cable.

The locking device may include an elastic portion having one end that is fixed to the guide frame and the other end that is fixed to the cushion frame, and providing an elastic force to move the cushion frame to the front of the guide frame.

The locking device may include a bracket portion rotating the locking ring to release the locking of the cushion frame when the seat back is folded.

The bracket portion may include a first bracket provided on one side of an upper surface of the cushion frame to be rotated when the back frame is folded, and a second bracket provided on the other side of the upper surface of the cushion frame and rotated by the first bracket to rotate the locking ring and to release the locking of the cushion frame, wherein a lower end portion of the back frame and the first bracket are connected through a cable, and when the back frame is folded, the cable is pulled to rotate the first bracket.

A guide groove may be formed on a side portion of the connection member, and a guide protrusion that is inserted into the guide groove is formed on a side portion of the cushion frame.

A bearing may be provided in the cushion frame to be in rolling contact with the guide frame.

According to various aspects of the present invention, the seat cushion may be slidable forward, and thus the support of the femoral region of a passenger and riding comfort can be increased. Further, the angle can be lowered when the seat back is folded, and thus a step height between the seat back and a luggage trim can be reduced to increase the efficiency of the luggage loading.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIGS. 7A and 7B illustrate an operation state of an exemplary locking device according to the present invention, in which FIG. 7A is a view illustrating a locking device before its operation, and FIG. 7B is a view illustrating a locking device after its operation.

FIGS. 8A to 8C illustrate a slide movement state of an exemplary cushion frame according to the present invention, in which FIG. 8A is a view illustrating a cushion frame before its operation, FIG. 8B is a view illustrating a cushion frame in a movement state, and FIG. 8C is a view illustrating a cushion frame on which a passenger is seated.

FIGS. 9A to 9C illustrate a slide movement state of a cushion frame when a back frame is folded, in which FIG. 9A is a view illustrating a back frame before its folding operation, FIG. 9B is a view illustrating a back frame in a semi-folded state, and FIG. 9C is a view illustrating a back frame in a fully folded state.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

According to a fold-and-dive structure for a vehicle seat according to various embodiments of the present invention, a seat cushion 10 moves to slide forward and is locked by a locking device 600. Accordingly, the support of the femoral region of a passenger and riding comfort can be improved, and a step height between a folded seat back 20 and a luggage trim be reduced to increase the easiness of the luggage loading.

That is, according to the fold-and-dive structure for a vehicle seat according to various embodiments of the present invention, the femoral region of a passenger can be supported through movement of the seat cushion 10 forward even in a state where a passenger is seated on a seat.

Figure 1:
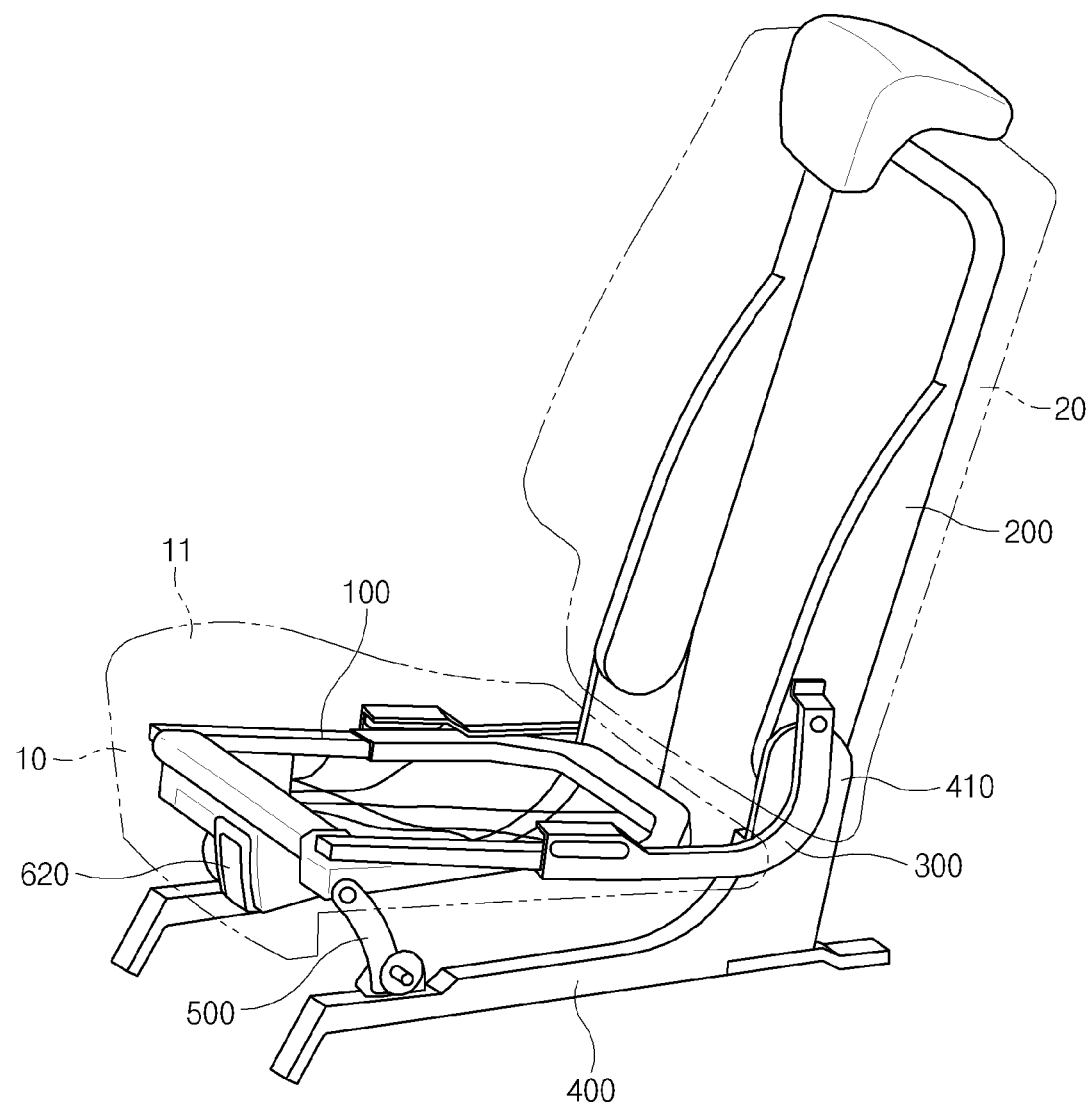
FIG. 1 is a perspective view illustrating an exemplary fold-and-dive structure for a vehicle seat according to the present invention.
Figure 2:
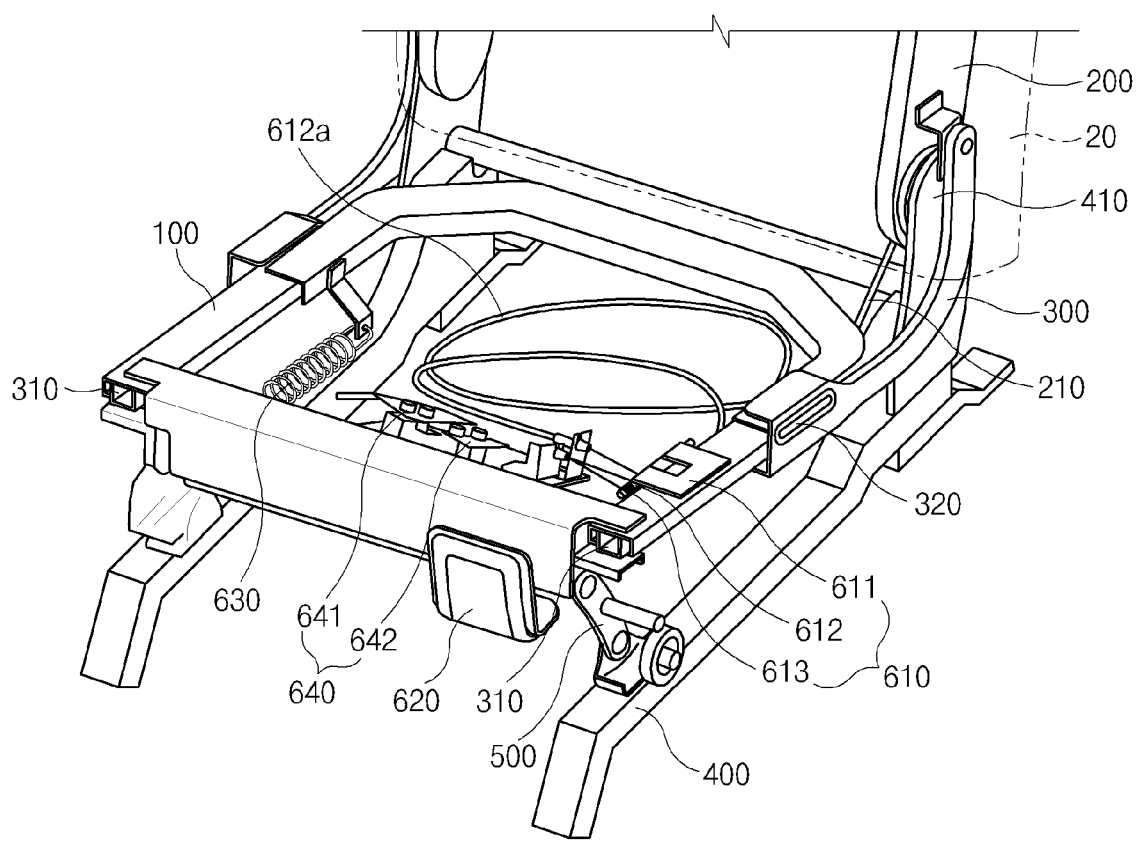
FIG. 2 is a partial enlarged view of FIG. 1.

The fold-and-dive structure for a vehicle seat according to various embodiments of the present invention, as illustrated in FIGS. 1 and 2, includes a cushion frame 100 provided inside the seat cushion 10, a back frame 200 provided inside a seat back 20, a connection member 300 of a boomerang shape which connects the cushion frame 100 and the back frame 200 to each other, a support frame 400 fixed to a bottom surface of an inner portion of a vehicle, a rotating link 500 connecting a front end portion of the cushion frame 100 and a front end portion of the support frame 400 to each other, and a recliner 410 which is provided on a rear end portion of the support frame 400 and to which a lower end portion of the back frame 200 is rotatably connected.

In the fold-and-dive structure for a vehicle seat according to various embodiments of the present invention, if the seat back 20 is folded, the connection member 300 moves forward along the seat back 20, and the seat cushion 10 moves forward by the movement of the connection member 300. At the same time, the rotating link 500 is rotated to dive the seat cushion 10 downward, and thus the height of the seat can be lowered.

However, there is a limit in increasing riding comfort of a passenger or lowering a folding angle of the seat back only through the fold-and-dive structure for a vehicle seat as described above.

The fold-and-dive structure for a vehicle seat according to various embodiments of the present invention further includes a structure for automatically making the seat cushion 10 slide, and thus the riding comfort of a passenger is improved and the folding angle of the seat back 20 is lowered. Hereinafter, the fold-and-dive structure for a vehicle seat having the above-described function according to various embodiments of the present invention will be described.

A guide frame 310 is provided on a front side portion of the connection member 300, and is formed to extend from an innerside surface of the connection member 300 to the front of the vehicle. Both end portions of the cushion frame 100 are coupled to an upper surface of the guide frame 310 to slide forward.

That is, the cushion frame 100 slides forward along the guide frame 310 provided on the connection member 300, and thus the femoral region of a passenger is supported and riding comfort is increased.

Figure 3:
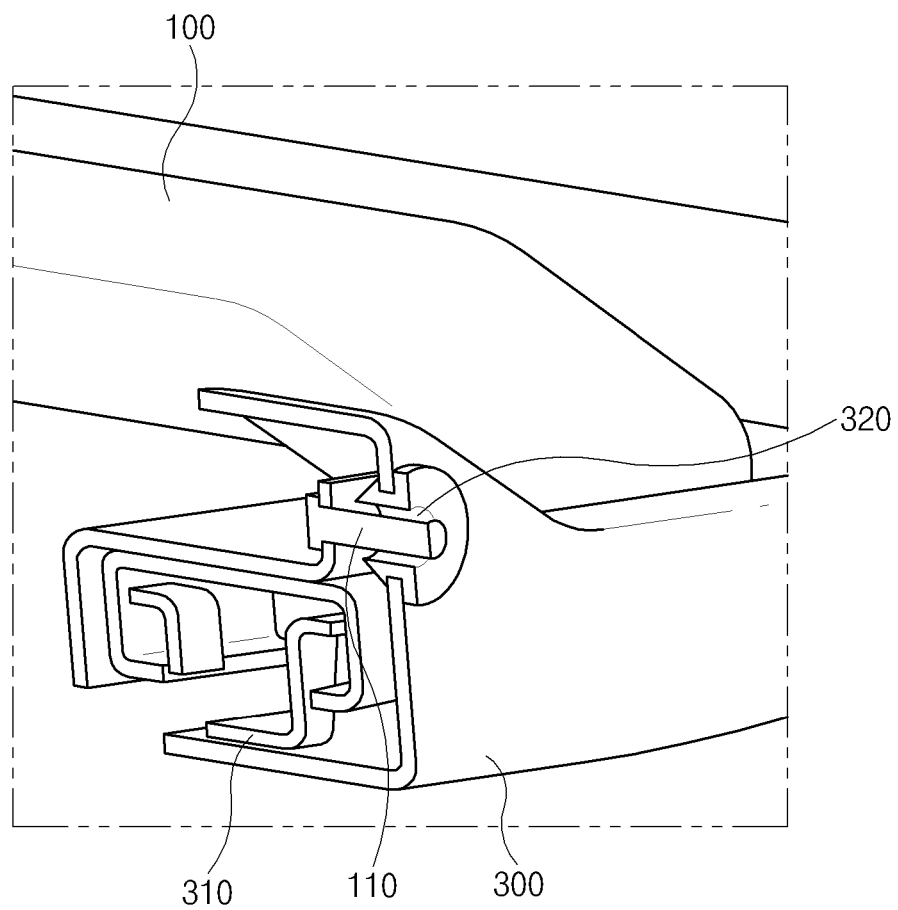
FIG. 3 is a perspective view illustrating an exemplary guide groove and guide protrusion according to the present invention.

Here, an adjustment portion for limiting the slide movement distance of the cushion frame 100 is provided between the cushion frame 100 and the connection member 300. The adjustment portion, as illustrated in FIG. 3, includes a guide groove 320 formed on a front side portion of the connection member 300, and a guide protrusion 110 which is formed to project from the side portion of the cushion frame 100 and is movably inserted into the guide groove 320.

That is, the guide protrusion 110 moves within the guide groove 310 to limit the movement distance of the cushion frame 100.

On the other hand, the fold-and-dive structure for a vehicle seat according to various embodiments of the present invention includes a locking device 600 locking or unlocking the cushion frame 100 that slides along the guide frame 310.

Figure 4:
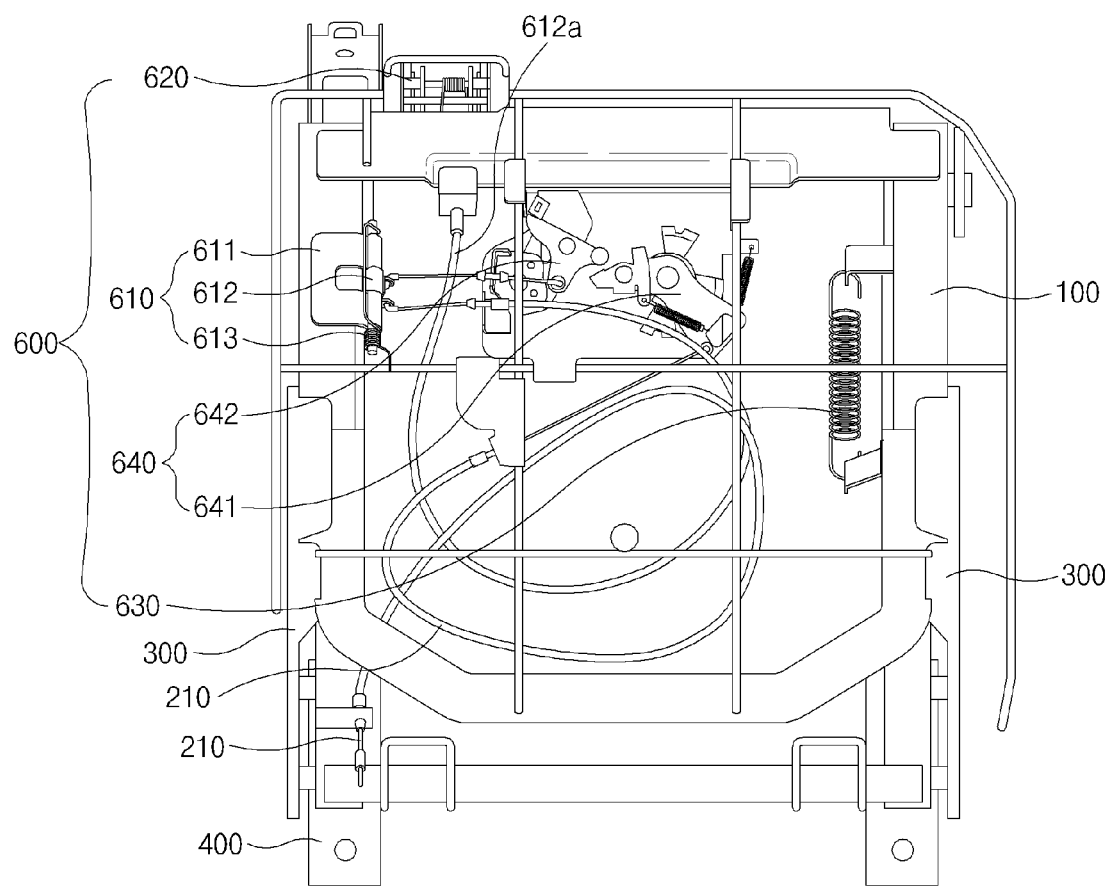
FIG. 4 is a plan view of an exemplary fold-and-dive structure for a vehicle seat according to the present invention.

The locking device 600, as illustrated in FIG. 4, includes a locking portion locking or unlocking the cushion frame 100 in or from the guide frame 310, and a lever 620 releasing locking of the locking portion 610 to make the cushion frame 100 slide along the guide frame 310.

Figure 5:
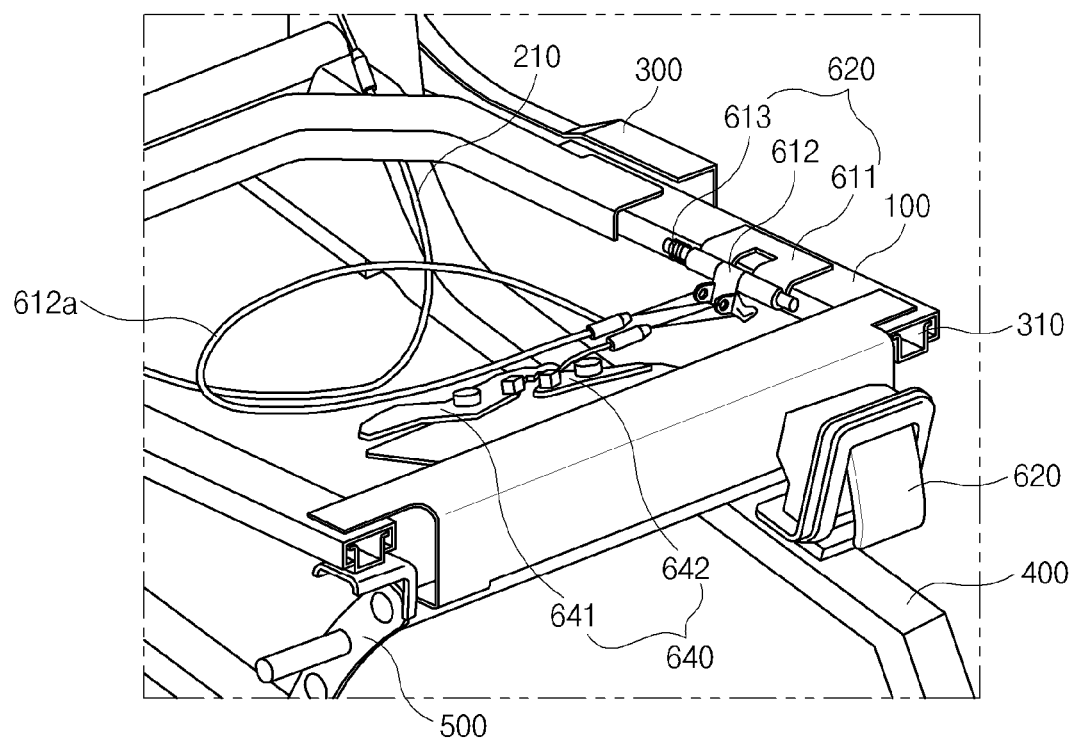
FIG. 5 is a perspective view illustrating an exemplary locking portion according to the present invention.

The locking portion 610, as illustrated in FIG. 5, includes a fixing piece 611 fixed to an upper side portion of the cushion frame 100, a locking ring 612 hinge-fixed to the side portion of the fixing piece 611 and locked in the side portion of the guide frame 310, and a spring 613 coupled to the locking ring 612 and the hinge portion of the fixing piece 611 to provide an elastic force to the locking ring 612 in the direction of the guide frame 310.

Here, on the side portion of the guide frame 310, a plurality of locking holes 311 are formed at equal intervals along the length direction of the guide frame, and the locking ring 612 is inserted and locked in one of the locking holes 311.

The lever 620 is rotatably fixed to one front side of the cushion frame 100, and is connected to the locking ring 612 through a cable 612a. That is, if the lever 620 is pulled, the cable 612a is pulled along the lever 620 to rotate the locking ring 612, and thus the rotating locking ring 612 secedes from the locking hole 311 to make the cushion frame 100 slide forward or backward along the guide frame 310.

In this state, if the lever 620 is released, the locking ring 612 returns to its original position by the spring 613 while the cable 612a returns to its original position, and the locking ring 612 is inserted into the locking hole 311 to make the cushion frame 100 lock in the guide frame 310 again.

By making the cushion frame 100 slide along the guide frame 310 or lock in the guide frame 100 using the locking device 600, the seat cushion 10 moves forward or backward to be fixed.

Here, the locking device 600 includes an elastic portion 630 that automatically makes the cushion frame 100 slide at the same time when the locking ring 612 secedes from the locking hole 311.

The elastic portion 630 is composed of a compression spring having one end that is fixed to one front side of the guide frame 310 and the other end that is fixed to one rear side of the cushion frame 100.

Figure 6:
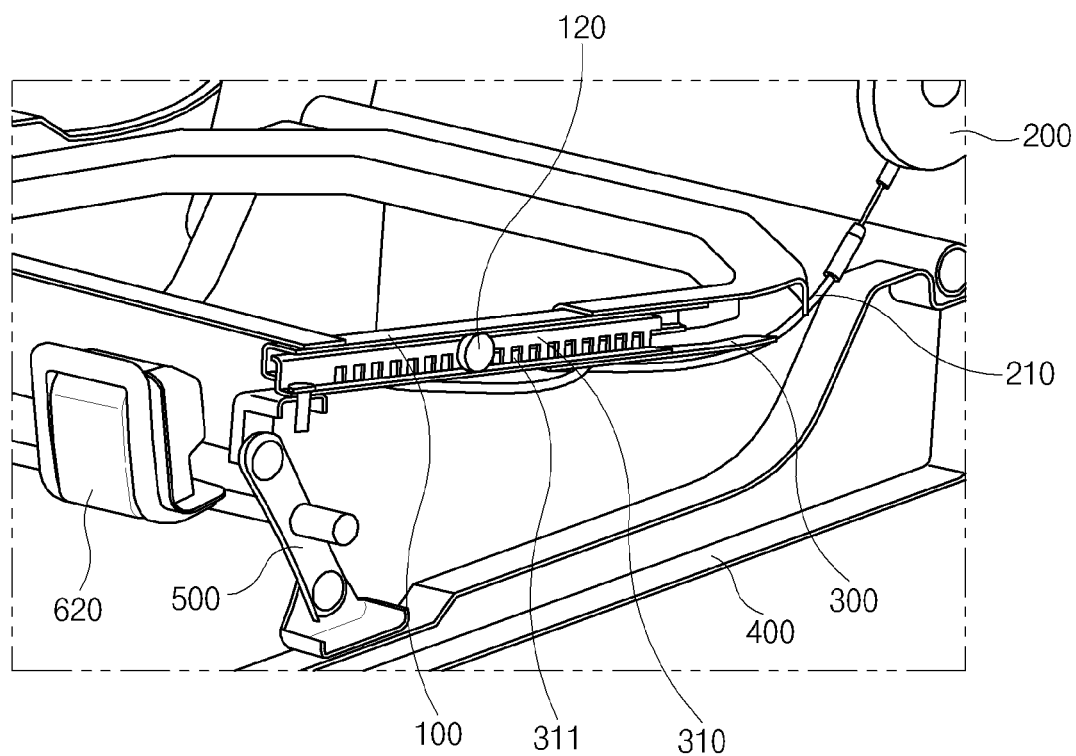
FIG. 6 is a partial cross-sectional view illustrating an exemplary guide frame according to the present invention.

That is, by the compression force of the elastic portion 630, the cushion frame 100 is forced to move to the front of the guide frame 310 as illustrated in FIG. 6, and when the locking of the locking ring 612 in the locking hole 311 is released, the cushion frame 100 automatically moves along the guide frame 310.

On the other hand, the locking device 600 includes a bracket portion 640 that rotates the locking ring 612 that is locked in the locking hole 311 to release the locking when the seat back 20 is folded. The bracket portion 640 automatically moves the cushion frame 100 forward during the folding of the seat back 20 to lower the angle of the seat back 20.

That is, while the seat cushion 10 dives and slides forward during the folding of the seat back 20, a bolster portion of the seat cushion 10 further moves forward than the seat back 20, and thus the angle of the seat back 20 can be further lowered.

The bracket portion 640, as illustrated in FIG. 7, includes a first bracket 641 rotatably provided on one side of the upper surface of the cushion frame 100 to be rotated when the back frame 200 dives, and a second bracket 642 rotatably provided on the other side of the upper surface of the cushion frame 100 and rotated when the first bracket 641 that is connected to the second bracket 642 is rotated to release the locking of the locking ring 612 that is locked in the locking hole 311.

Figure 7A:
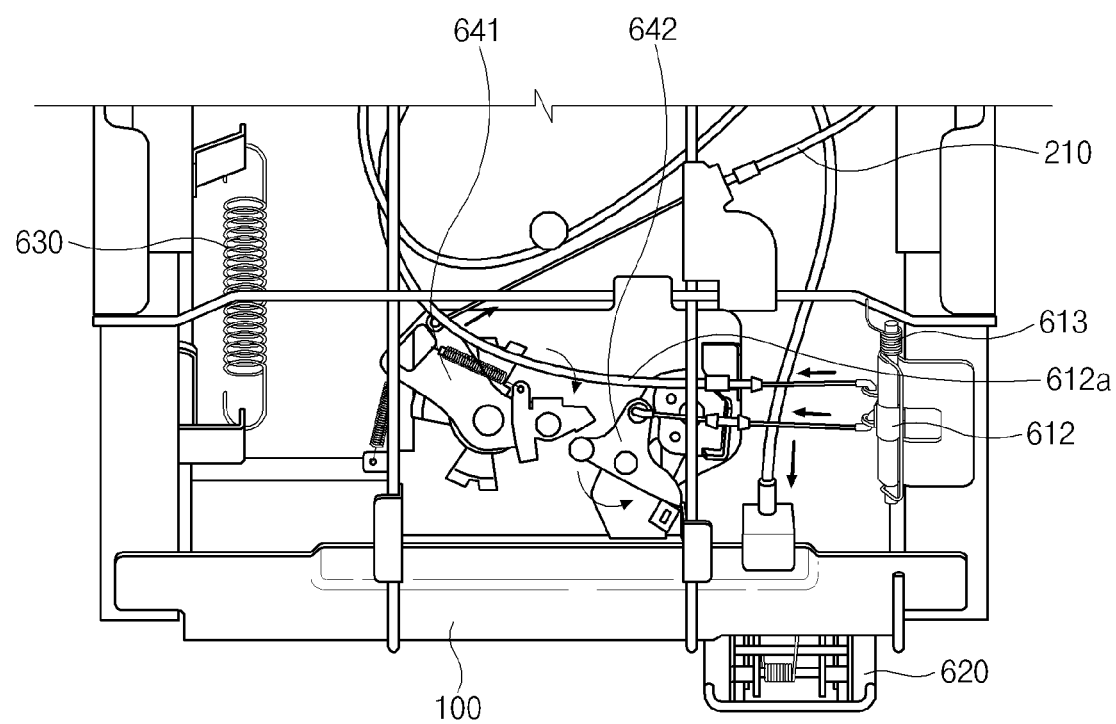
Figure 7B:
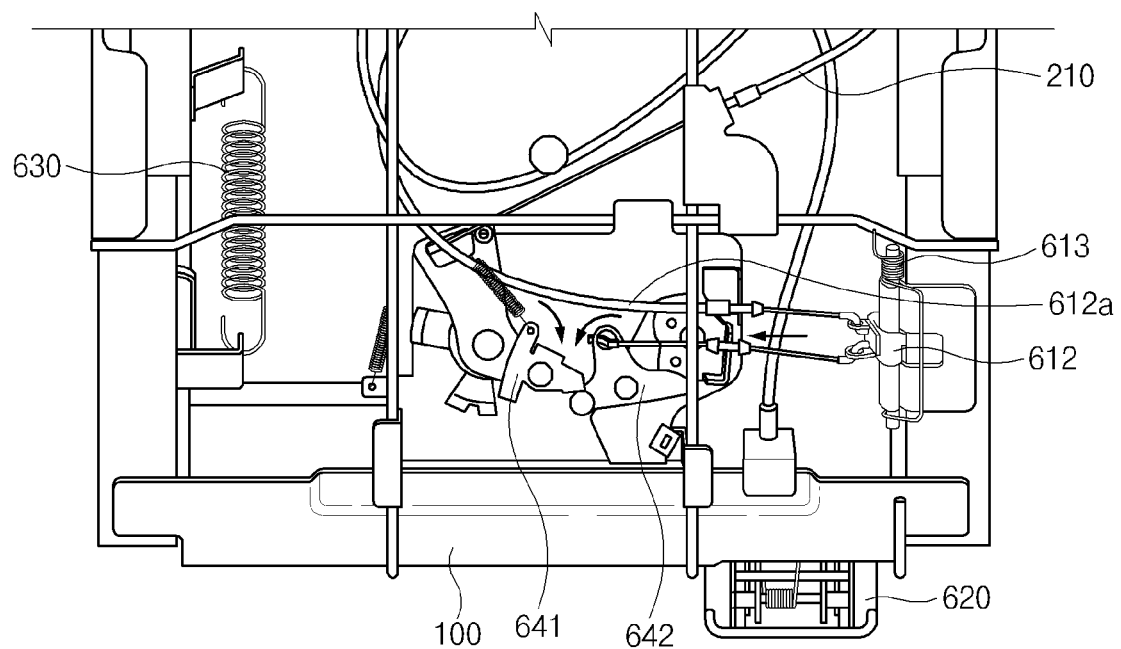

Here, the lower end portion of the back frame 200 and the first bracket 641 are connected through the cable 210, and when the back frame 200 is rotated as illustrated in FIG. 7A, the lower end portion of the back frame 200 moves backward to pull the cable 210. If the cable 210 is pulled, the first bracket 641 is rotated to rotate the second bracket 642 as illustrated in FIG. 7B, and thus the locking ring 612 is rotated to release the locking of the locking ring 612 in the locking hole 311. At the same time, the cushion frame 100 slides along the guide frame 310 by the elastic portion 630.

On the other hand, a bearing 120 is provided in the cushion frame 100 to be in rolling contact with the guide frame 310, and through this bearing 120, vibration and noise are minimized while the cushion frame 100 moves.

Hereinafter, the operation of the fold-and-dive structure for a vehicle seat having the above described construction according to various embodiments of the invention will be described.

[Movement of Seat Cushion to Increase Passenger's Riding Comfort]

Figure 8A:
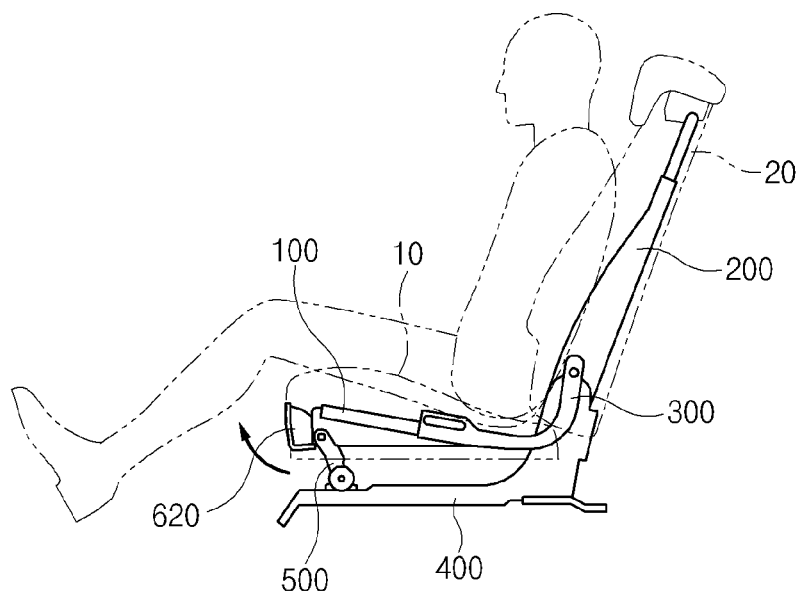
Figure 8B:
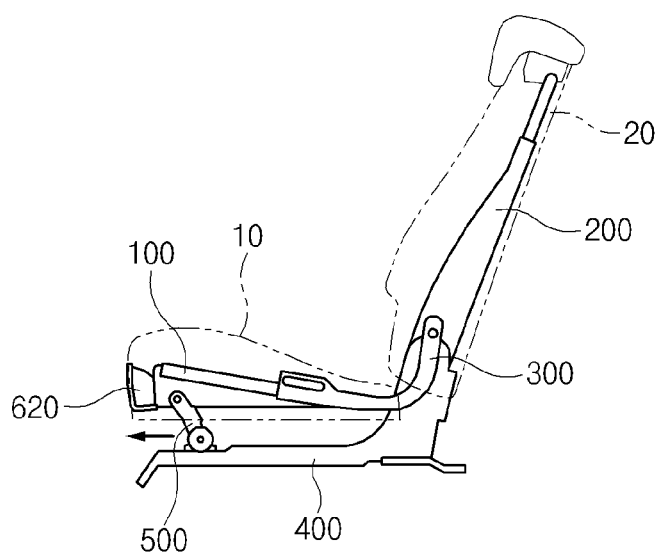

If a passenger releases the locking of the locking portion 610 by pulling the lever 620 provided on the seat cushion 10 of the seat as illustrated in FIG. 8A, the seat frame 100 slides forward along the guide frame 310 by the elastic force of the elastic portion 630 as illustrated in FIG. 8B, and thus the length of the seat cushion 10 is increased.

If the lever 620 is released in this state, the locking portion 610 is locked again to make the cushion frame 100 locked in the guide frame 310, and thus the seat cushion 10 is fixed.

Figure 8C:
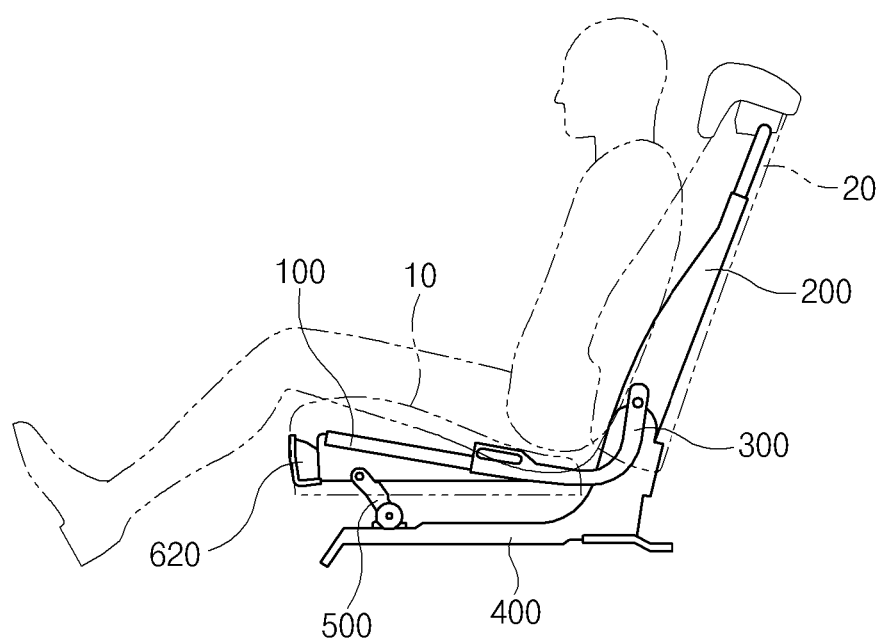

If the passenger is seated on the seat cushion after the adjustment of the distance of the seat cushion 10 is completed, as illustrated in FIG. 8C, the seat cushion 10 stably support the femoral region of the passenger to increase the support and riding comfort of the passenger.

[Movement of Seat Cushion During Fold-and-Dive Operation of Seat]

Figure 9A:
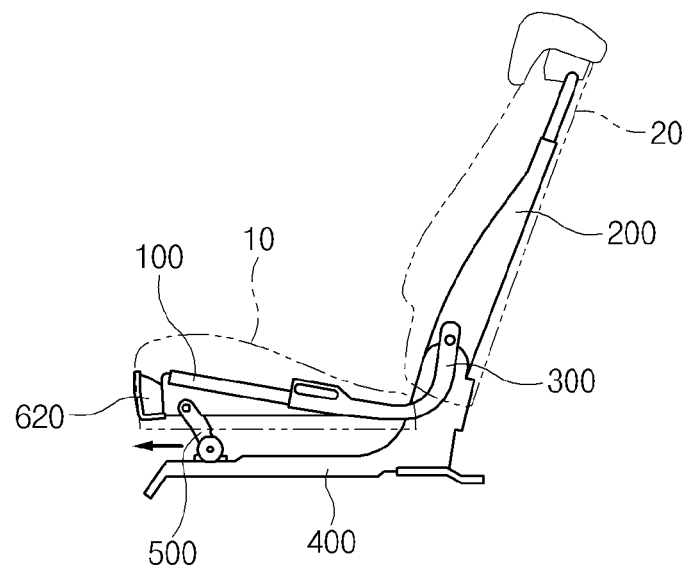

On the other hand, if the seat back 20 is folded as illustrated in FIG. 9A, the seat back 20 is rotated and the locking of the locking portion 610 is released by the bracket portion 640. At this time, the cushion frame 100 slides forward along the guide frame 310 by the elastic portion 630.

Figure 9B:
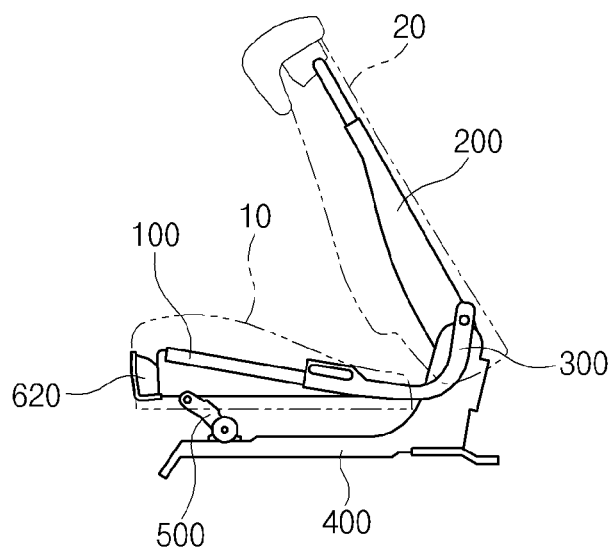
Figure 9C:
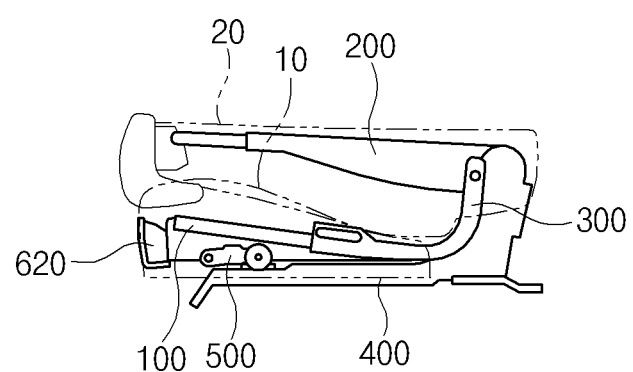

That is, when the back frame 200 is folded, as illustrated in FIG. 9B, the cushion frame 100 moves forward by the connection member 300, and dives downward by the rotating link 500 at the same time. Since the cushion frame 100 slides forward, as illustrated in FIG. 9C, the folding angle of the seat back 20 can be lowered.

For convenience in explanation and accurate definition in the appended claims, the terms upper or lower, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fold-and-dive structure for a vehicle seat comprising:
a connection member interconnecting a cushion frame of a seat cushion and a back frame of a seat back;
a rotating link interconnecting a front end portion of the cushion frame and a support frame;
a recliner provided on the support frame to which a lower end portion of the back frame is rotatably connected; and
a guide frame is provided on a front side portion of the connection member;
wherein the cushion frame is slidably coupled to the guide frame to make the seat cushion slide forward;
wherein the cushion frame is locked and unlocked from the guide frame by a locking device;

wherein the locking device comprises a locking portion locking the cushion frame in the guide frame, and a lever for releasing locking of the locking portion;

wherein the locking portion comprises a fixing piece fixed to a side portion of the cushion frame, a locking ring rotatably hinge-fixed to the fixing piece and inserted into a side portion of the guide frame to make the cushion frame lock in the guide frame, and a spring providing an elastic force to the locking ring;

wherein the locking ring releases the locking of the cushion frame as the locking ring is rotated about the fixing piece when the lever is operated;

wherein the locking device comprises a bracket portion rotating the locking ring to release the locking of the cushion frame when the seat back is folded;

wherein the bracket portion comprises a first bracket provided on one side of an upper surface of the cushion frame to be rotated when the back frame is folded, and a second bracket provided on the other side of the upper surface of the cushion frame and rotated by the first bracket to rotate the locking ring and to release the locking of the cushion frame; and wherein a lower end portion of the back frame and the first bracket are connected through a cable, and when the back frame is folded, the cable is pulled to rotate the first bracket.

2. The fold-and-dive structure for a vehicle seat according to claim 1, wherein a plurality of locking holes are formed on the side portion of the guide frame in a length direction, and the locking ring is inserted into the locking holes to lock the cushion frame.

3. The fold-and-dive structure for a vehicle seat according to claim 1, wherein the lever is mounted in front of the cushion frame, and is connected to a locking ring through a cable.

4. The fold-and-dive structure for a vehicle seat according to claim 1, wherein the locking device comprises an elastic portion having one end that is fixed to the guide frame and the other end that is fixed to the cushion frame, and providing an elastic force to move the cushion frame to the front of the guide frame.

5. The fold-and-dive structure for a vehicle seat according to claim 1, wherein a guide groove is formed on a side portion of the connection member, and a guide protrusion that is inserted into the guide groove is formed on a side portion of the cushion frame.

6. The fold-and-dive structure for a vehicle seat according to claim 1, wherein a bearing is provided in the cushion frame for rolling contact with the guide frame.

* * * * *